(12) United States Patent
Grinberg

(10) Patent No.: US 8,204,768 B1
(45) Date of Patent: Jun. 19, 2012

(54) SYSTEM AND METHOD FOR PROJECTING FLEXIBLE SPENDING ACCOUNT ALLOCATIONS

(75) Inventor: Milton Grinberg, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 1227 days.

(21) Appl. No.: 11/694,290

(22) Filed: Mar. 30, 2007

(51) Int. Cl.
G06Q 40/00 (2012.01)
(52) U.S. Cl. .............................. 705/4; 705/35
(58) Field of Classification Search .................. 705/35, 705/4
See application file for complete search history.

(56) References Cited

U.S. PATENT DOCUMENTS

| | | | |
|---|---|---|---|
| 6,826,541 B1 | 11/2004 | Johnston et al. | |
| 6,868,386 B1 | 3/2005 | Henderson et al. | |
| 7,380,707 B1* | 6/2008 | Fredman ....................... | 235/379 |
| 2006/0064332 A1 | 3/2006 | Schoenbaum et al. | |
| 2007/0043595 A1 | 2/2007 | Pederson | |
| 2007/0175985 A1 | 8/2007 | Barnes et al. | |
| 2008/0033750 A1* | 2/2008 | Burriss et al. ..................... | 705/2 |

OTHER PUBLICATIONS

Mbhunter, "Taking some risk out of end-of-year FSA activities", Mighty Bargain Hunter, Dec. 2, 2006.*

* cited by examiner

Primary Examiner — Eric T Wong
(74) Attorney, Agent, or Firm — McKay and Hodgson, LLP; Philip McKay; Sean P. Lewis

(57) ABSTRACT

A system and method for projecting a flexible spending account (FSA) allocation for a consumer may be dependent on historical healthcare-related claim information, including health insurance claim information and FSA reimbursement claim information. The method may be implemented as a web-based service or as a stand-alone software application. An FSA allocation application may identify, in historical claim information, recurring expenses predicted to be incurred in a given future time period, and may estimate an initial allocation for the time period based on these recurring expenses. The FSA allocation application may produce a recommended allocation by adjusting the initial allocation dependent on expected changes in the consumer's health insurance plan, the consumer's dependents, the health of one or more family members, tax regulations, or costs of medical services. An FSA allocation application may be configured to exchange information with a comprehensive healthcare management application, which may maintain the historical claim information.

40 Claims, 7 Drawing Sheets

| Menu 1  Menu 2  Menu 3  Menu 4 | Menu bar 452 |
| □ △ ◇ ○ ☆ | Tool bar 454 |
| / Allocate FSA \ / tab 2 \ / tab 3 \ | Tab bar 456 |

FSA allocation screen 420

| Health plan year | field 430 |
| Health plan code | field 435 |

Changes to dependents?  ☑ yes 421  ☐ no 422

Known changes in health?  ☑ yes 423  ☐ no 424

Estimate initial default allocation?  ☐ select 425  result field 432

Produce recommended FSA allocation?  ☑ select 426  result field 434

Compare to current health plan?  ☑ select 427  result field 436

Add comments to healthcare data (optional):

field 440

☑ Submit 442

Display 450

*FIG. 4A*

| Menu 1 Menu 2 Menu 3 Menu 4 | Menu bar 452 |
| Tool bar 454 |
| update dependents / tab 2 / tab 3 | Tab bar 456 |

FSA dependent update screen 520

| Dependent name | display field 530 |
| Drop this dependent? | ☑ yes 521   ☐ no 522 |
| Dependent name | display field 530 |
| Drop this dependent? | ☐ yes 521   ☑ no 522 |
| Add new dependent? | ☑ yes 541   ☐ no 542 |
| New dependent name | field 543 |
| New dependent age | field 544 |

Add comments to healthcare data (optional):

field 550

☑ Submit 552

Display 450

*FIG. 4B*

| Menu 1 Menu 2 Menu 3 Menu 4 | Menu bar 452 |
| □ △ ⌂ ◇ ☆ | Tool bar 454 |
| /update health\ /tab 2\ /tab 3\ | Tab bar 456 |

FSA health update screen 620

Family member:      field 630

Diagnosis code:      field 635

New diagnosis?      ☑ yes 621    ☐ no 622

Estimate yearly expenses:      field 623

Drop this diagnosis?      ☐ yes 642    ☑ no 642

Change recurring expenses for this diagnosis?    ☑ yes 643    ☐ no 644

New recurring expense (yearly total):      field 645

Add comments to healthcare data (optional):

field 650

☑ Submit 652

Display 450

*FIG. 4C*

SYSTEM AND METHOD FOR PROJECTING FLEXIBLE SPENDING ACCOUNT ALLOCATIONS

BACKGROUND

Healthcare consumers may be enrolled in one or more health insurance plans, such as medical insurance plans, dental insurance plans, prescription plans, or vision insurance plans. For example, various health insurance plans may be offered by a consumer's employer or by an employer of the consumer's spouse. Other health insurance plans may be available to individual consumers or self-employed individuals, or to members of a professional society or industry organization. Each of these health plans may have different health plan characteristics, including the conditions covered, the doctors participating in the plans, the premiums paid by an employer or the consumer, deductibles, co-payments, out-of-pocket yearly maximum expenses, lifetime maximum expenses, and other characteristics.

In addition to health insurance plans, healthcare consumers may be able to take advantage of various types of medical reimbursement accounts, according to applicable regulations. For example, a consumer may participate in a "cafeteria plan" that includes a flexible spending account (FSA). Pre-tax money may be set aside by an employer in the FSA and then distributed to the consumer as reimbursement for qualified medical expenses not paid by the consumers health insurance plan(s). If any money remains in the account after the end of a current health plan year (e.g., if there are not enough qualified expenses to recover the money set aside), the consumer may lose the remaining funds. In many cases the amount allocated to an FSA must be determined once for the upcoming year and may not be changed.

In order to try to estimate an optimum allocation for an FSA, consumers may sift through stacks of confusing documents to determine what their total healthcare-related expenses were for any given health insurance plan year, how much their health insurance plan paid, and how much they paid out-of-pocket. As healthcare costs continue to escalate, health insurance plan characteristics change and become more complex, and regulations regarding reimbursement accounts change, it may be difficult for a consumer to decide how much money to allocate to an FSA for an upcoming year.

SUMMARY

Various embodiments of a system and method for projecting flexible spending account (FSA) allocations for a healthcare consumer are disclosed. In some embodiments, the methods described herein may be implemented as a network-based or web-based service, hosted on an FSA allocation service server. A software application executing on the server (or a server portion of an FSA allocation application) may be configured to access historical healthcare-related claim information, such as health insurance claim information and/or flexible spending account reimbursement claim information. In some embodiments, this historical claim information may be received from a comprehensive healthcare management application executing locally or remotely, such as on a client computing system or another server computing system. In other embodiments, historical claim information and/or a client portion of the FSA allocation application may be maintained and/or executed locally on a consumer's computing system (e.g., on a client computing system.)

An FSA allocation application may in some embodiments be configured to analyze historical claim information to identify one or more recurring expenses within the claim information and to determine if any of the one or more recurring expenses are predicted to be incurred in a given future time period, such as an upcoming health insurance plan year. The FSA allocation application may be configured to estimate an initial flexible spending account allocation dependent at least in part on one or more recurring expenses predicted to be incurred in a future time period, such as an upcoming health insurance plan year.

An FSA allocation application may in some embodiments be configured to produce a recommended flexible spending account allocation for a future time period (such as an upcoming health insurance plan year). This recommended flexible spending account allocation may dependent at least in part on an initial flexible spending account allocation estimated based on historical claim information, and optionally on projected benefits of one or more health insurance plans for the future time period. In some embodiments, the consumer may be prompted to input additional information to be used in producing a recommended FSA allocation, such as one or more expected changes in his or her health insurance plans, one or more changes in his or her qualified dependents, and/or one or more anticipated changes in the health status of one or more family members covered by the consumer's health insurance plan(s).

In some embodiments, the methods described herein may be implemented as a stand-alone software application, executing on a consumer's computing system, or as an application executing on one or more peer nodes in a peer-to-peer computing environment, rather than in an environment employing a client/server computing model. For example, one peer node in a peer-to-peer computing environment may be configured to host a server portion of an FSA allocation application (acting as a server for the application) and other peer nodes may access the application using a client portion of the application.

BRIEF DESCRIPTION OF THE DRAWINGS

FIGS. 4A-4C illustrate exemplary displays and user interfaces that may be provided by an FSA allocation application, according to various embodiments.

Figure 1:
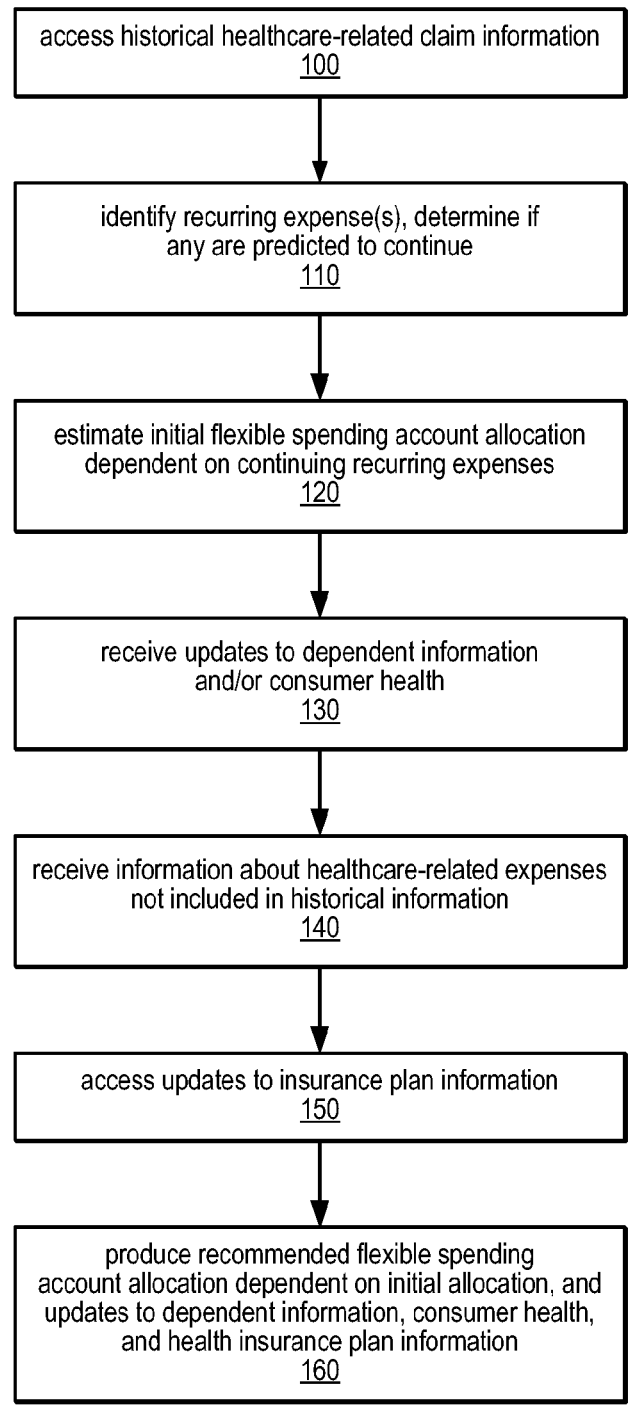
FIG. 1 illustrates a method for projecting a flexible spending account (FSA) allocation, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and method for projecting an allocation for a consumer's flexible spending account (FSA) are disclosed. In some embodiments, the method may include accessing the consumer's historical health insurance claim information and/or historical FSA claim information (e.g., claim information from one or more previous health plan years) and using this information in determining an initial FSA allocation for a given time period, such as a future health insurance plan year or a time period between two opportunities to adjust an FSA allocation (either of which may be referred to as an "FSA plan period"). For example, a consumer may have the opportunity to adjust an FSA allocation during an "open enrollment" period, or when a change in status occurs for the consumer between open enrollment periods (e.g., when a marriage, birth, death, or change in employment status occurs in the consumer's family in the middle of a health insurance plan year.) The method may in some embodiments include accessing the consumer's current health plan information and/or information about changes to the consumer's health plan, and using this information in determining a recommended FSA allocation for a future time period. The FSA allocation method described herein may in some embodiments be implemented as software application executing on a consumer's computing device. In other embodiments, an FSA allocation application may be implemented as a service hosted on a remote computing system, such as a web-based service accessible over a network by subscribers to the service, or may be implemented as a combination of a web-based service and a locally executed client application.

In some embodiments, an FSA allocation application as described herein may be a part of (or may be configured to interact with) a comprehensive healthcare management application or system. A healthcare management application may in some embodiments provide a consumer with a framework and tools for collecting, organizing, and managing data related to their health history; past, current and future health services; health insurance plan(s) (e.g., what services are covered, coverage limits, claims status, and explanations of benefits); and finances related to healthcare (e.g., health insurance premiums, deductibles, co-payments, benefit payments, reimbursements from FSAs, Healthcare Reimbursement Accounts (HRAs) or health savings accounts (HSAs), maximum out-of-pocket expenses, and maximum lifetime benefits.) For example, a healthcare management application may be configured to provide a consumer with a comprehensive and detailed health history, or may allow the consumer to extract and/or analyze his or her data regarding a particular health condition or event (e.g., an injury or illness) or a particular healthcare-related service (e.g., a particular diagnostic exam or a course of treatment for a chronic condition.)

A healthcare management application may in some embodiments be implemented as a web-based service to which consumers and/or employers may subscribe. In other embodiments, it may be implemented as a stand-alone application, such as one installed and executed on a desktop computer by a consumer. In some embodiments, a healthcare management application may include both a locally installed application (i.e., a client portion) and a remote, web-based application (i.e., a server portion). For example, in one embodiment, a consumer may enter healthcare-related information on a locally installed client application and then may upload the information to a healthcare management service server for secure storage and/or further analysis. In other embodiments, a consumer may interact with a healthcare management service through another user interface application, such as a standard web browser application. The healthcare management service may in some embodiments be hosted on a server computing system and may be accessed by client computing systems. In other embodiments, the healthcare management service may be implemented in a peer-to-peer environment, with a healthcare management application hosted on one or more peer nodes acting as a server for this application, and accessible by one or more other peer nodes.

In various embodiments, a healthcare management application may receive information from one or more of: a consumer, one or more healthcare providers, one or more health plan administrators (e.g., health insurance representatives), and one or more financial institutions. The information received and/or managed by a healthcare management application may be formatted according to a standard data exchange format, in some embodiments.

A healthcare management application may in some embodiments maintain healthcare-related information in one or more databases (or in other suitable formats) in a local or remote memory, or in a combination of the two. For example, a database located on a healthcare management service server may be configured to securely store healthcare-related information for multiple individual consumers or for employees of one or more corporations subscribing to the healthcare management service, while a database stored locally on a consumer's computing system may include only his or her own personal healthcare-related data.

The information managed by a healthcare management application may in some embodiments be extracted for use by other applications, such as the FSA allocation application described herein. For example, in one embodiment, an FSA allocation application may be configured to extract historical claim information from the healthcare management application for use in determining an FSA allocation for a future year.

Similarly, information may be extracted from other applications for management, organization, and/or analysis by a healthcare management application. In one embodiment, an FSA allocation application may be configured to provide estimates of recurring or one-time expenses to a healthcare management application to be managed along with other healthcare-related information. For example, a consumer may enter information about a newly diagnosed condition in the FSA allocation application (including a diagnosis code, treatment codes, prescription information, an estimate of recurring costs, or other information relevant for projecting reimbursable expenses), and this information may be provided to a healthcare management application and associated with other information about the condition, such as insurance information, healthcare provider information, results of any procedures or treatments, ongoing treatment options, etc.

As used herein, the terms "flexible spending account" and/or "FSA" may refer to any one of several types of medical reimbursement accounts having pre-defined tax implications from which qualified medical, dental, and/or vision expenses may be reimbursed. For example, these accounts may in various embodiments include FSAs, Health Savings Accounts (e.g., HSAs associated with high-deductible health insurance plans), Medical Savings Accounts (MSAs), limited-purpose FSAs (e.g., FSAs restricted to reimbursements for vision and/or dental expenses), and/or any other accounts meeting applicable regulations dealing with reimbursement of qualified healthcare-related expenses.

An exemplary method for projecting an FSA allocation is illustrated in FIG. 1. In this example, the method may include accessing historical healthcare-related claim information, as in 100. Healthcare-related claim information may include information about one or more claims filed with various health insurance providers and/or processed on behalf of health insurance providers, such as dates of service, costs of service, one or more identifiers of a diagnosis, procedure, treatment, service, or prescription, negotiated rates, amounts subject to a deductible, amounts paid to a service provider, amounts owed by the consumer, or any other relevant information, such as that included on an explanation of benefits (EOB) statement or other statement of claim status. The historical information may also include information about one or more claims filed for reimbursement from various flexible spending accounts, such as dates of service, costs of service, one or more identifiers of a diagnosis, procedure, treatment, service, or prescription, negotiated rates, amounts subject to a deductible, amounts paid to a service provider by a health insurance provider, amounts paid by the consumer, or any other relevant information.

Figure 2:
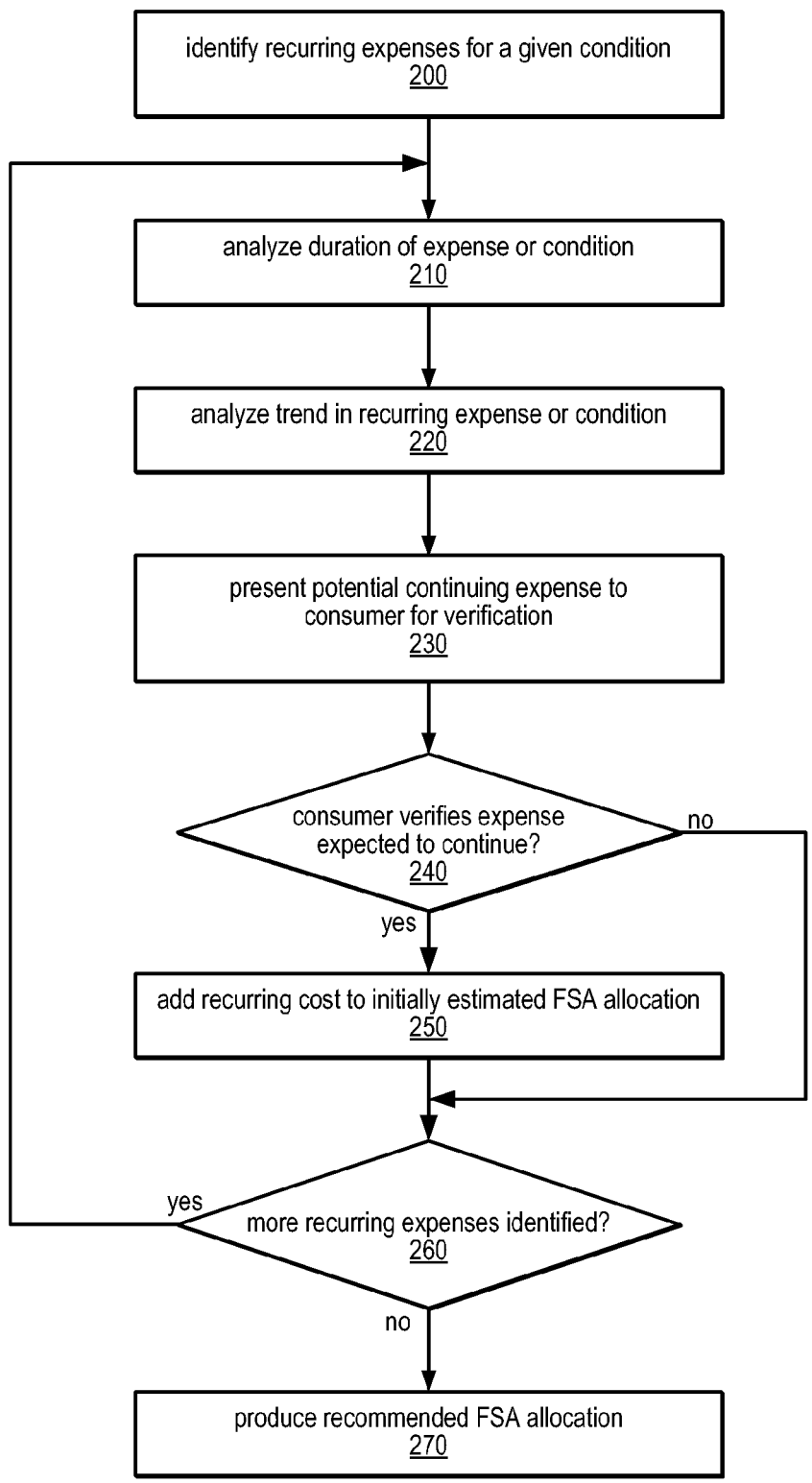
FIG. 2 illustrates an exemplary method for identifying recurring healthcare-related expenses that are likely to be incurred in a given time period.

The method may include analyzing the historical information to identify prior expenses that are recurring expenses and/or to determine if any prior expenses are predicted to be incurred in a future health plan year, or in another future time period (e.g., an FSA plan period), as in 110. A more detailed example of how such an analysis may be performed is illustrated in FIG. 2 and described below.

Once any continuing prior and/or recurring expenses are identified, the method may include estimating an initial FSA allocation based on the results of the analysis of recurring expenses, as in 120. For example, if the analysis indicates that a chronic condition requires the continued use of a particular prescription drug, or an ongoing series of physical therapy sessions, the expected out-of-pocket expenses for the medication or services may be included in an initial estimate for an FSA allocation.

The method for projecting an FSA allocation may in some embodiments include receiving updates to dependent information and/or a family member's health, as in 130, and using this information in projecting the FSA allocation. For example, the consumer may be prompted to enter any known or expected changes in their dependents' status (e.g., if one or more dependents no longer qualify for coverage under the consumer's health insurance policy or if a new dependent has been or will be added to the consumer's health insurance policy.) In another example, the consumer may be prompted to enter any known or expected changes in the health of a family member covered under the consumer's health insurance policy (e.g., a recent diagnosis, a planned or scheduled elective surgery or diagnostic procedure, the upcoming completion of a course of treatment, or any other known change to health likely to affect healthcare expenditures.) Various embodiments of a method for receiving changes to dependent status and/or health and for applying such changes to projection of an FSA allocation are described in more detail below.

As illustrated in FIG. 1, the method for projecting an FSA allocation may in some embodiments include receiving information about historical healthcare expenses that were not claimed under a consumer's health insurance policy or for FSA reimbursement and/or which is not included in the historical information accessible through a healthcare management application. This is illustrated at 140. For example, a consumer may not have filed for reimbursement for qualified over-the-counter expenses in a previous year because he or she did not have enough money in an FSA to cover these expenses, or because he or she was not aware that they qualified for FSA reimbursement. In another example, a consumer may not have filed for reimbursement for healthcare-related expenses that did not qualify for reimbursement under prior year regulations, but that may be qualified for reimbursement in a future time period due to changes in those regulations. In some embodiments, the consumer may be prompted to enter any such expenses that may be recurring expenses (e.g., actual or estimated expenses) for use in adjusting the recommended FSA allocation to include such expenses.

The method for projecting an FSA allocation may in some embodiments include accessing updates to the consumer's health insurance plan information, as in 150, and using this information to further refine a projected FSA allocation. For example, if the co-payment for prescription drugs that the consumer has used and/or expects to use in the future or for office visits to a consumer's primary care physician changes from $10 to $25 on his or her current health insurance plan, the projected FSA allocation may be increased. In another example, if the deductible for a consumer's health plan is expected to drop from $2000 per family to $1500 per family, the projected FSA allocation may be decreased. Similarly, if the consumer expects to change insurance providers or to choose a different health insurance plan from his or her current provider, the projected FSA allocation may be increased or decreased in accordance with changes in deductibles, co-payments, or other projected expenses under the new plan. The method may in some embodiments take into account two or more health insurance plans, under which one or more family members are covered, when projecting an FSA allocation. For example, if a child is covered by two different health insurance plans (e.g., one health plan offered by his or her mother's employer and another health plan offered by his or her father's employer), the method may include estimating which of the child's expected healthcare-related expenses may be covered by each plan, and what the remaining out-of-pocket expenses will be. Similarly, the method may include estimating coverage of multiple types of healthcare-related insurance plans with or without overlapping coverage (e.g., one or more medical insurance plans, vision insurance plans, prescription plans, and/or dental plans.)

In some embodiments, the user may be prompted to enter information identifying a health insurance provider or a specific health insurance plan, and the method may include obtaining details (e.g., coverage, doctors on the plan, premiums, deductibles, co-payments, or out-of-pocket maximums) of the identified plan directly from the insurance provider. In other embodiments, the consumer may be prompted to enter some or all of this information for his or her health insurance plan(s).

In some embodiments, the method may include analyzing historical claim information (and any updates entered by the consumer as described above) along with health plan characteristics and/or any expected changes in health plan characteristics to project FSA qualified expenses for the following year and produce a recommendation for an FSA allocation for that year. This is shown in 160. While in the example illustrated in FIG. 1, an initially estimated allocation (e.g., one based on historical claim data for recurring expenses) may be based only on actual expenses incurred, in other embodiments an initially estimated allocation may also take into account expected changes in health plan characteristics. For example, the method may include adjusting recurring expenses included in the initially estimated allocation according to updated health plan characteristics.

While the example illustrated in FIG. 1 and described above refers to projection of a single FSA allocation, in some embodiments, the method may include projecting allocations for two or more healthcare-related reimbursement accounts. For example, if a consumer has a Health Savings Account (e.g., an HSA associated with a high-deductible health insurance plan), he or she may also have a limited-purpose FSA (e.g., one restricted to reimbursements for vision and/or dental expenses.) The system and method for projecting an FSA allocation described herein may in some embodiments be configured to project allocations for each of these accounts, dependent on the types of expenses predicted to be incurred and the types of accounts from which they may be reimbursed.

As noted above, a system and method for projecting an FSA allocation may include means for analyzing historical health-care related claim information to identify any recurring expenses and determine if they are likely to be incurred in a given time period, such as in one or more future health insurance plan years or other FSA plan periods. FIG. 2 illustrates one embodiment of a method for performing such an analysis. In this example, historical claim information (e.g., health insurance claim information, EOBs, and/or medical reimbursement account information) may be scrutinized to identify recurring expenses for a given condition, as in 200. In some embodiments, scrutinizing historical information to identify recurring expenses may include searching for multiple claims associated with duplicate information, such as a particular physician name, service provider name or location, diagnosis code, treatment or procedure name or code, prescription name, pharmacy or clinic name or location, or dollar amount. In some embodiments, identifying recurring expenses may include identifying any patterns in the timing of claims filed and/or services received, such as identifying a bi-weekly psychiatric appointment, a monthly prescription refill, or a yearly diagnostic exam (e.g., a dental exam, mammogram, PAP test, or PSA screening test). In some embodiments, such patterns may be detected in historical information covering multiple previous health plan years (e.g., dental x-rays may be performed every two years, or a colonoscopy every five years).

Some prior expenses may be identified as recurring expenses from an individual claim or EOB, rather than from a duplication or pattern detected in multiple prior expenses, in some embodiments. In some such embodiments, if a diagnosis code or treatment code corresponds to an illness, injury, or treatment that typically involves ongoing expenses for some period of time, an initial expense associated with the illness, injury, or treatment may be identified as a recurring expense even if it has only been incurred once. For example, a single prior expense for physical therapy, dialysis, chemotherapy, or orthodontia may be identified as a recurring expense, since these types of treatments typically involve a series of treatments.

As illustrated in FIG. 2, for each recurring expense identified, the method may include determining if the recurring expense is likely to continue and if so, at what cost. As shown in 210, the method may include analyzing how long a given recurring expense or associated condition has existed. For example, if a prescription for a particular medication has been filled monthly for the last five years, the expense may be considered to be associated with a chronic condition, and may be predicted to continue. If, on the other hand, another medication was prescribed and filled monthly for six months of the previous year, but not in the most recent two months, the expense may be considered unlikely to continue. Similarly, if the analysis indicates the long-term, steady purchase of particular over-the-counter items (e.g., allergy medications, contact lens solution, hearing aid batteries, diabetes test kits, or other qualifying items), or long-term, steady claims for other qualifying healthcare expenses (e.g., contact lenses, costs of maintaining a guide dog, wheelchair rental, or specialized tutoring for a child with a physical or mental disability), these expenses may be predicted to continue. On the other hand, a diagnostic test that has been performed every two years for the last ten years may not be likely to be performed in the coming year if it was performed in the previous year.

In some embodiments, a method for determining if the recurring expense is likely to continue may include analyzing historical claim information to detect a trend in the claims for a given service, treatment, or condition. In one embodiment, if an analysis of historical claims information indicates that treatments for a particular condition are tapering off, the out-of-pocket expenses for the treatments may be considered likely to continue, but also to continue to taper off. For example, if claims information indicate that physical therapy services associated with a particular injury were received twice per week for two months, then once per week for two months, these expenses may be predicted to continue, but at a reduced rate (e.g., once every two weeks), for another two months. Similarly, if the dosage on a recurring prescription has dropped by half every four months, expenses related to this prescription may be predicted to continue, and the prescription may be assumed to drop in dosage (and, in some instances, in cost) in another four months. In another example, if a family member has incurred a monthly expense related to orthodontic treatments (e.g., braces) for the past 15 months, the expense may be considered likely to continue into the next health plan year, but not to last for the entire next health plan year.

In some cases, trends detected in historical claim information may indicate that a particular condition is improving, as in the examples described above, and that associated expenses are likely to stabilize, decrease, or end. On the other hand, trends detected in historical claim information may indicate that the consumer's health is degenerating. For example, the method for projecting an FSA allocation may include associating various claims with particular conditions and may include identifying that the number of claims and/or the total expenses associated with a particular condition have increased sharply over given time period and are therefore likely to continue to increase. In some embodiments, the method may include comparing an increase in costs associated with a particular condition to an overall increase in the cost of healthcare to determine if a trend is likely to be due to a degenerating condition rather than to an increase in the cost of a constant level of treatment for a chronic, but stable, condition.

In the example illustrated in FIG. 2, the method may include presenting a consumer with an opportunity to confirm that expenses predicted to continue are, in fact, expected to continue. This is shown at 230. If the consumer verifies that a potentially continuing expense is expected to continue, shown as the positive exit from 240, the method may include adding this expense to an initial estimate for an FSA allocation, as in 250. If the consumer indicates that the expense is not expected to continue, shown as the negative exit from 240, the expense may not be added to an initial estimate for an FSA allocation. An exemplary input mechanism for presenting these expenses to a consumer and receiving feedback is described below with regard to FIG. 4C.

In some embodiments, when a recurring expense is added to an initial estimate for an FSA allocation, it may be adjusted (e.g., increased or decreased) dependent on a most recent occurrence, a trend in the expense amount over multiple occurrences, or on any expected changes in health plan information, as described above.

As illustrated in FIG. 2, the operations shown as 210-250 may be repeated for any or all recurring expenses identified in historical claim information. In some embodiments, an initial estimate for an FSA allocation may be calculated as the sum of any recurring expenses predicted to be incurred during the time period of interest. In other embodiments, an initial estimate for an FSA allocation may be calculated as the sum of any recurring expenses predicted to be incurred adjusted for inflation, detected trends and/or expected changes in health plan information. Once all recurring expenses have been categorized as likely to continue or unlikely to continue, and an initial allocation has been estimated, the method may include producing a recommended FSA allocation, as in 260 and as described above.

The methods illustrated in FIGS. 1 and 2 are meant to be exemplary methods only. In various embodiments, methods for estimating or recommending an FSA allocation may include more, fewer, or different operations than those illustrated in FIGS. 1 and 2. For example, in some embodiments, the methods may include more or fewer opportunities for a consumer to input and/or verify additional information used by an FSA allocation application to estimate or recommend an FSA allocation (i.e., information other than historical claim information accessible by the FSA allocation application).

In various embodiments, the methods for projecting an FSA allocation described herein may be implemented as a software application configured to perform the functionality described. In some embodiments, an FSA allocation application may be configured to perform the operations illustrated in FIGS. 1 and 2, or similar operations, for projecting an FSA allocation dependent on historical healthcare-related claim information and other inputs. An FSA allocation application may in some embodiments be configured to interact with a comprehensive healthcare management application and/or with one or more other applications, and may exchange information with the other applications as part of projecting an FSA allocation.

Figure 3:
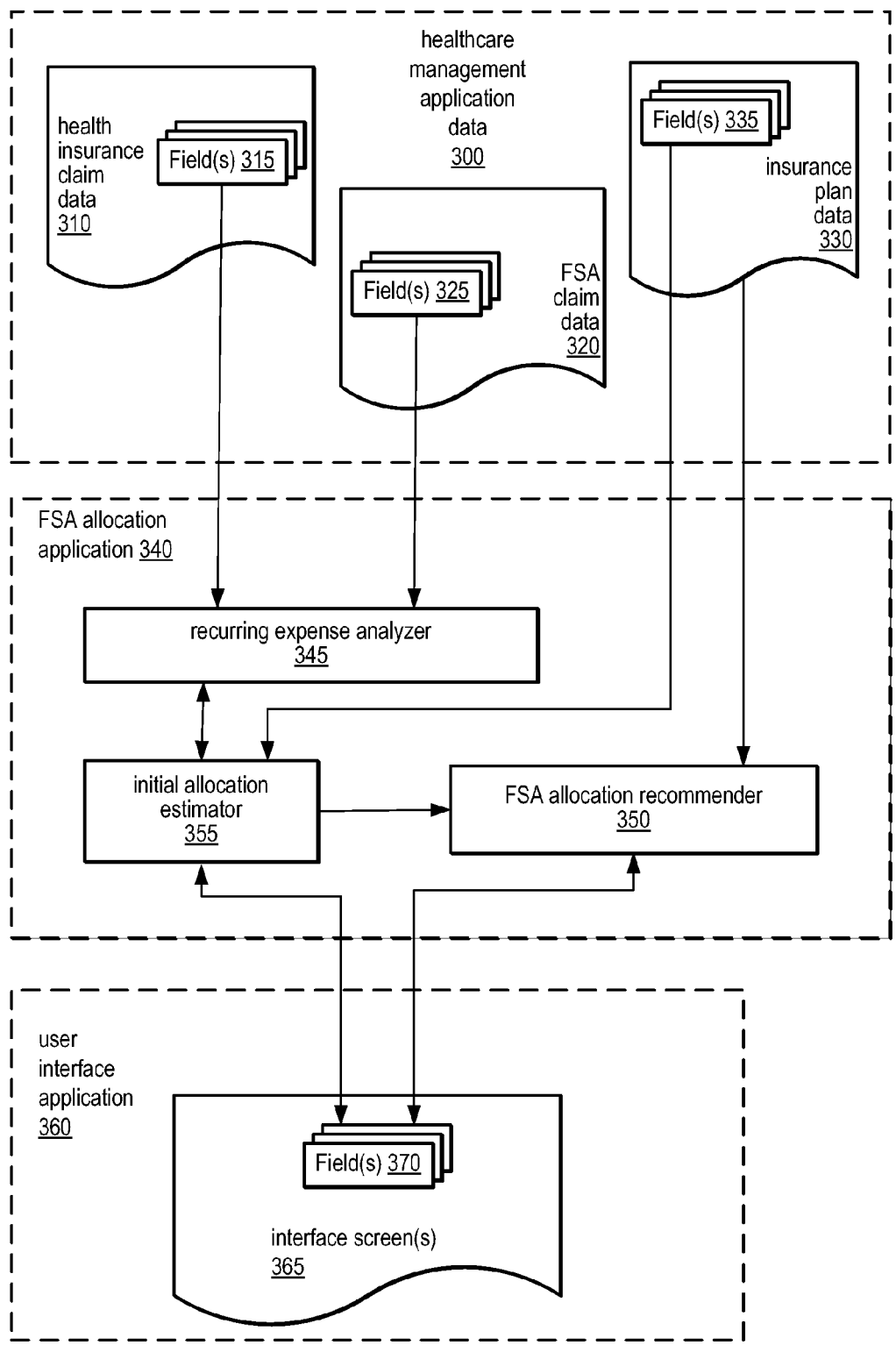
FIG. 3 illustrates a data flow diagram for an FSA allocation application, according to one embodiment.

A data flow diagram for one embodiment of an FSA allocation application is illustrated in FIG. 3. In this example, an FSA allocation application 340 includes a recurring expense analyzer 345, an initial allocation estimator 355, and an FSA allocation recommender 350. As illustrated in FIG. 3, FSA allocation application 340 is configured to extract information from healthcare management application data 300. In this example, healthcare management application data may include health insurance claim data 310, FSA claim data 320, and insurance plan data 330.

In some embodiments, healthcare management application data 300 may be maintained in a database located on a healthcare management service server configured to securely store healthcare-related information for multiple individual consumers or for employees of one or more corporations subscribing to a healthcare management service. In other embodiments, healthcare management application data 300 may be maintained in a database stored locally on a consumer's computing system and may include only his or her own personal healthcare-related data.

In some embodiments, insurance plan data 330 may include health plan characteristics for one or more medical insurance plans, vision insurance plans, prescription plans, and/or dental insurance plans. For example, insurance plan data 330 may include information about covered services, coverage levels, doctors on each plan, medications covered by each plan, deductibles, co-payments, maximum out-of-pocket limits, or other details about one or more plans offered to a consumer through one or more employers of the consumer and/or the consumer's spouse. In some embodiments, insurance plan data 330 may include information about one or more FSAs, such as the various types of medical reimbursement accounts described herein.

In some embodiments, insurance plan data 330 may include industry-wide, employer-wide, regional, or insurance company-specific aggregated data from multiple consumer accounts that may be used to estimate costs of upcoming procedures or ongoing treatments. In some embodiments, insurance plan data 330, or other data stored within healthcare management application data 300, may include inflation rates, tax code information, or other financial and/or regulatory guidelines that may be kept up-to-date so that changes in qualifying expenses, limits on how much can be put into an FSA, or other relevant changes may be considered when estimating an initial FSA allocation or recommending an FSA allocation for an upcoming year.

FSA allocation application 340 may be configured to interact with a consumer through any of various user interface applications, such as user interface application 360. In some embodiments, FSA allocation application 340 may be a web-based service accessed using a standard web browser application, and user interface application 360 may be a web browser application. In other embodiments, a user interface application 360 may be included in FSA allocation application 340, rather than being a separate software application.

As illustrated in FIG. 3, recurring expense analyzer 345 may be configured to extract historical claim information from various fields 315 and 325 of health insurance claim data 310 and/or FSA claim data 320, respectively. These fields may in some embodiments conform to a standard format for healthcare-related claim information. For example, each of fields 315 and/or 325 may be configured to store a value of a particular field that is standard on claim forms or EOBs from one or more health insurance providers or flexible spending account providers (e.g., a date of service, an identifier of a service provider, a diagnosis code, a procedure code, an identifier of a medication, a billed cost, a negotiated cost, an amount subject to a deductible, an amount paid to a provider, an amount owed by a consumer, an amount paid by a consumer, or any other relevant data). Recurring expense analyzer 345 may be configured to analyze this information to identify recurring expenses, as described above. In some embodiments, recurring expense analyzer 345 may be configured to determine which, if any, recurring expenses are predicted to be incurred in a given time period, such as in the next health plan year or the next FSA plan period.

Once recurring expenses that are predicted to be incurred in the given time period are identified, initial allocation estimator 355 may be configured to estimate an initial FSA allocation for that time period dependent on these recurring expenses. In some embodiments, the initially estimated FSA allocation may be equal to the sum of the recurring expenses predicted to be incurred, while in others it may be adjusted based on input from the consumer. For example, the consumer may be prompted to verify if a recurring expense that is predicted to be incurred by recurring expense analyzer 345 is, in fact, expected to be incurred. As illustrated in FIG. 3, the consumer may be presented with one or more expenses predicted to be incurred in the time period of interest in one or more fields 370 of an interface screen 365 and may enter an indication that the expense is (or is not) expected to be incurred in another of fields 370. In some embodiments, initial allocation estimator 355 may be configured to adjust the initial estimate for an FSA allocation based on expected changes to health plan characteristics, shown as extracted information from one or more of fields 335 in insurance plan data 330.

FSA allocation recommender 350 may take as its inputs the initial estimate for the FSA allocation (as determined by initial allocation estimator 355), health plan information (e.g., information extracted from one or more fields 335 of insurance plan data 330), and/or information entered by the consumer in one or more fields 370 of one or more interface screens 365. Various exemplary interface screens 365 are illustrated in FIGS. 4A-4C, and are described in more detail below.

Note that in some embodiments, FSA allocation application 340 may also be configured to provide estimates of upcoming recurring or one-time expenses to a healthcare management application to be managed along with other healthcare-related information in healthcare management application data 300 (not shown). For example, a consumer may enter information about a newly diagnosed condition in FSA allocation application 340 through user interface application 360, and this information may be provided to the healthcare management application and associated with other information about the condition, such as insurance information, healthcare provider information, results of any procedures or treatments, or ongoing treatment options. In some embodiments, FSA allocation application 340 may be configured to provide the initial estimated FSA allocation, the recommended FSA allocation, and/or any other intermediate values used to produce the initial estimated FSA allocation and/or the recommended FSA allocation to the healthcare management application for maintenance in healthcare management application data 300.

FSA allocation application 340 may in some embodiments be configured to interact with one or more financial management applications, such as a bill paying application, personal financial or tax planning application, or any similar application (not shown). For example, in some embodiments, FSA allocation application 340 may be configured to extract information about healthcare-related expenses from a personal financial management application in addition to (or instead of) a healthcare management application. In such embodiments, healthcare-related expenses may be identified by provider (i.e., by the payee), by the date of an expense, by a comment or expense category associated with an expense, or by any other suitable means. In some embodiments, interacting with a personal financial management application may allow FSA allocation application 340 to identify healthcare-related expenses that may not have been claimed under a health insurance plan or for reimbursement from a flexible spending account. In some embodiments, a personal financial management application may be configured to manage receipts or other transaction data compatible with an inventory information approval system, or HAS, which identifies reimbursable items purchased at participating grocery stores or pharmacies, and FSA allocation application 340 may be configured to extract such information for use in estimating an allocation for over-the-counter items qualified for FSA reimbursement. In some embodiments, such information may be extracted from FSA debit card account information, such as through an on-line service for managing an FSA.

As described above, an FSA allocation application may be configured to receive input from a consumer through any of various user interfaces, including a graphical user interface (GUI). FIGS. 4A-4C illustrate exemplary user interfaces suitable for entering information relevant to projecting an FSA allocation, according to various embodiments. FIG. 4A illustrates an exemplary user interface screen suitable for invoking an FSA allocation application, whether executed locally or as a web-based service. In this example, as in FIGS. 4B and 4C, a display (in this case, display 450) may include one or more of, but is not limited to, a menu bar (e.g., menu bar 452), a tool bar (e.g., tool bar 454), and a tab bar (e.g., tab bar 456). In the example illustrated in FIG. 4A, menu bar 452 may provide one or more menus for accessing various functionalities of an FSA allocation application via user-selectable interface items (i.e., menu selections). Tool bar 454 may provide one or more tool icons for accessing various tools of the FSA allocation application. Tab bar 456 may provide one or more tabs for switching between various views presented to a consumer accessing an FSA allocation application.

In the example illustrated in FIG. 4A, the currently selected tab displays an FSA allocation screen 420 that may be used to initiate the projection of an FSA allocation. In this example, various fields are illustrated that may serve as display fields, data entry fields or both. Field 430, for example, may display a current or next health plan year, or may be used to enter a health plan year for which an FSA allocation projection is desired, in different embodiments. Similarly, field 435 may display a current or future health plan code (i.e., an identifier of a particular health insurance provider or health insurance plan) or may be used to enter a health plan code for an upcoming year (e.g., if the consumer is changing their health plan election for the upcoming year.)

In the example illustrated in FIG. 4A, the consumer may be prompted to select various options when initiating an FSA projection. For example, the consumer may indicate that he or she expects or knows about changes regarding his or her dependents and/or changes in the health of one or more family members by selecting checkboxes 421 and/or 423. The consumer may also select whether he or she would like to be presented with an initial estimate for an FSA allocation (such as one generated dependent on historical claim information), a recommended FSA allocation (such as one adjusted for changes in dependent status, health status and/or health insurance plan characteristics), and/or a comparison of the FSA allocation recommendations for the selected health plan versus a current health plan by checking one or more of checkboxes 425, 426, and 427. In this example, an initial estimate for an FSA allocation may be displayed in result field 432 in response to selection of checkbox 425, and a recommended FSA allocation may be displayed in result field 434 in response to selection of checkbox 426. In this example, if checkbox 427 is selected, a difference between a recommended FSA allocation for the consumer assuming that he or she is covered by the selected health plan and a recommended FSA allocation for the consumer assuming that he or she is covered by their current health plan may be displayed in result field 436 (e.g., "$200 more" or "−$350".)

In various embodiments, data may be entered into various fields of a user interface by selecting a field and typing in data, by selecting a field and a data value for the field using a pull-down menu, by selecting a checkbox or radio button, or by any other suitable means. In some embodiments, an optional comment field (e.g., comment field 440) may be provided so that the consumer may enter other information that may be provided to the FSA allocation application and/or an associated healthcare management application and maintained along with the estimated or recommended FSA allocation. For example, a consumer may wish to project two or more different FSA allocations for an upcoming year dependent on a choice of health plans offered to him or her and may enter comments identifying the various projections. In the example illustrated in FIG. 4A, when the consumer has completed his or her selections and/or entered any relevant data, he or she may submit the selections and/or data to the FSA allocation application by selecting checkbox 442 ("submit").

If a consumer indicates that changes are expected for one or more dependents for an upcoming health plan year (e.g., by selecting checkbox 421), the FSA allocation application may present the consumer with another screen, such as FSA dependent update screen 520, illustrated in FIG. 4B. As illustrated in FIG. 4B, this screen may be used to display, modify, or enter new information regarding a dependent of the consumer, in various embodiments. In this example, each of the consumers' current dependents may be displayed in one of fields 530, or the consumer may enter the name of a dependent for whom there are changes in one of fields 530. For each dependent named in one of fields 530, the consumer may be prompted to indicate whether the dependent will be dropped from the consumer's health plan in the upcoming year, such as by selecting one of checkboxes 521 ("yes") or 522 ("no"). For example, a consumer may indicate that a child will no longer be covered as a dependent if he or she is past a certain age, is not (or will not be) living in the consumer's household, and/or is not (or will not be) a full-time student, or that a spouse will no longer be covered as a dependent following a divorce. If a dependent will be dropped from the consumer's health plan, the FSA allocation application may be configured to determine which, if any, historical claim information and/or recurring expenses are associated with the dependent and to exclude this information from an initially estimated FSA allocation and/or a recommended FSA allocation. In some embodiments, the consumer may be prompted to enter a date after which the dependent may be dropped and the FSA allocation application may be configured to pro-rate the expenses corresponding to the dependent when determining an initial FSA allocation or a recommended FSA allocation.

As illustrated in FIG. 4B, the consumer may also be prompted to enter the name and age of a new dependent, i.e., one that is expected to be added to the consumer's health plan in the upcoming year. For example, the consumer may enter "baby boy" in field 543 if a baby is expected to be born in the family in the upcoming year, or to enter the name of a child in the process of being adopted, a new spouse, a qualified parent or sibling who is expected to become part of the consumer's household, or the name of a child who is returning to school after a hiatus and is therefore eligible to be covered by the consumer's health plan in the upcoming year.

If the age of the new dependent is entered, as in field 544, the FSA allocation application may be configured to estimate a default total of healthcare-related expenses for a person of that age and to use this in projecting a recommended FSA allocation. For example, if a baby is expected to be born or adopted, the FSA allocation application may be configured to include estimated expenses for a birth and/or a standard schedule of newborn pediatric office visits, immunizations, and qualified over-the-counter items for a newborn. These may be based on similar expenses for another child in the household (e.g., adjusted for inflation and/or health plan changes in the interim), or on industry, employer, regional, or insurance company-specific averages accessible to the FSA allocation application (e.g., as healthcare insurance plan data). Similarly, if an adult (e.g. a sibling or parent) of a particular age will be added to the household, the FSA allocation application may be configured to include estimated expenses for an adult of that age based on family, industry, employer, regional, or insurance company-specific averages. In some embodiments, a consumer may be prompted to enter a date after which the dependent may be added and the FSA allocation application may be configured to pro-rate the estimated expenses corresponding to the new dependent when determining an initial FSA allocation or a recommended FSA allocation.

Once the consumer has entered any changes to dependent information (along with any optional comments, as in field 550), he or she may initiate projection of an initial or recommended FSA allocation dependent on the changes entered by selecting checkbox 552 ("submit").

If a consumer indicates that there are known (or expected) changes in the health of one or more family members for an upcoming health plan year (e.g., by selecting checkbox 423 of FIG. 4A), the FSA allocation application may present the consumer with another screen, such as FSA health update screen 620, illustrated in FIG. 4C. As illustrated in FIG. 4C, this screen may be used to display, modify, or enter information regarding the health of the consumer and/or one or more dependents of the consumer, in various embodiments. In this example, the consumer may enter in field 630 (or select using a pull-down menu) the name of a family member whose health has changed or for whom healthcare-related expenses are expected to change in the upcoming year.

In this example, field 635 may be used to display a diagnosis code associated with the designated family member or the consumer may enter (or select from a menu) a diagnosis code associated with an expected change for the designated family member. In this example, the consumer may indicate whether or not the diagnosis is new by selecting one of checkboxes 621 ("yes") or 622 ("no"). Another field, illustrated as field 623, may be used to display the estimated yearly expenses related to this diagnosis (e.g., dependent on historical claim information if it is not a new diagnosis, or based on industry, employer, regional, or insurance company-specific averages accessible to the FSA allocation application), or may be used by the consumer to enter estimated yearly expenses related to the diagnosis, in different embodiments. In some embodiments, the FSA allocation application may be configured to consider these estimates when estimating an initial FSA allocation or recommending an FSA allocation for the upcoming year.

As illustrated in FIG. 4C, the consumer may indicate that the change is that a particular diagnosis can be dropped (e.g., by selecting checkbox 642) if it is not expected that expenses associated with the diagnosis will be incurred in the upcoming year. For example, if a course of treatments (physical therapy or medication) has been completed and is not expected to be resumed, the consumer may indicate that the diagnosis no longer applies. In some embodiments, the FSA allocation application may be configured to exclude any historical recurring expenses associated with the diagnosis when estimating an initial FSA allocation or recommending an FSA allocation for the upcoming year.

If a particular diagnosis should not be dropped, but a change is expected in the recurring expenses (whether increasing or decreasing), the consumer may in some embodiments be prompted to indicate this and to enter a new estimate for expenses associated with the diagnosis (e.g., using fields 643, 644, and/or 645), and these changes may be considered during generation of an initially estimated FSA allocation and/or a recommended FSA allocation for the upcoming year. As in the previous examples, the consumer may also be able to include comments along with the health update, in field 650, before submitting any changes entered on FSA health update screen 620. If there are additional health changes to enter, the consumer may in some embodiments select or enter another family member's name and/or diagnosis and may enter the changes for those expenses before initiating generation of an initially estimated FSA allocation and/or a recommended FSA allocation.

FSA update screen 620, or a similar user interface screen, may in some embodiments also be used to enter estimated expenses for over-the-counter items or other qualifying expenses that were not included in historical claim information accessible to the FSA allocation application. For example, expenses estimated by the FSA allocation application for a particular condition (e.g., allergy shots and/or office visits to an allergist) may be displayed in field 623, and the consumer may be able to add additional expenses (e.g., over-the-counter antihistamines) to the estimated expenses for the condition by entering a new value in field 645 that includes both the earlier estimate and the additional expenses. In another example, FSA update screen 620, or similar, may be used to enter estimated expenses for glasses, contact lenses, contact lens solution, knee braces or other orthopedic appliances, massages or other qualifying therapies, or any other qualifying expenses that may not be included in historical claim information accessible by the FSA allocation application.

In some embodiments, FSA health update screen 620, or a similar user interface, may be used to enter estimated costs of known or expected upcoming medical procedures that may not have been included in historical claim information accessible by the FSA allocation application. For example, FSA health update screen 620 may be used to enter estimated costs for non-recurring (or infrequently recurring) diagnostic tests (e.g. a colonoscopy or other specialized screening), elective surgeries (e.g., a hernia repair, cataract surgery, or knee surgery), a new course of orthodontic treatments, an upcoming birth, or any other expected medical procedures the consumer wishes to have considered when estimating an initial FSA allocation or recommending an FSA allocation for the upcoming year. In some embodiments, entering information about an expected upcoming medical procedure or course of treatment may trigger a search of the consumer's historical claim information and/or industry, employer, regional, or insurance company-specific averages for a similar procedure or treatment, and any results of the search may be used in determining an estimated cost of the upcoming procedure or treatment. This estimate may then be included when estimating an initial FSA allocation or recommending an FSA allocation for the upcoming year As previously noted, an FSA allocation application may in some embodiments be presented to a consumer as an on-line service, e.g., one that includes a web-based user interface and is hosted on one or more server computing systems. An FSA allocation recommendation service may in some embodiments be implemented using a client/server model, which may include both a locally installed application (i.e., a client portion) and a remote, web-based application (i.e., a server portion). For example, in one embodiment, a consumer may enter healthcare-related information on a locally installed client application and then may upload the information to an FSA allocation recommendation service server for secure storage and/or further analysis. In other embodiments, the service may be implemented in a peer-to-peer environment, with an FSA allocation application hosted on one or more peer nodes acting as a server for this application, and accessible by one or more other peer nodes. In still other embodiments, the FSA application may be implemented as a stand-alone software application to be executed locally on a consumer's computing system. In various embodiments, an FSA application may have access to historical claim information, such as that described above, on the consumer's local computing system and/or on a remote computing system, such as on a server node of an FSA allocation recommendation service or of a comprehensive healthcare management service. In some embodiments, an FSA allocation application may be a module or function of a comprehensive healthcare management application, such as that described herein, rather than a separate software application. In some embodiments, an FSA allocation application and/or service may be accessed by a financial services professional (e.g., an accountant, tax consultant or financial advisor) on behalf of a consumer, instead of, or in addition to, being accessed by the consumer himself.

While the exemplary system and methods described above involve a recommendation for an allocation of money to one or more FSAs, HSAs, MSAs, or other accounts associated with reimbursement of qualified healthcare-related expenses, they may in some embodiments be applied to the allocation of money to one or more dependent care accounts (DCAs). For example, the methods may be used to access historical dependent care expenses (e.g., daycare expenses for one or more dependents of a consumer) and to determine an initial and/or recommended allocation for a DCA dependent at least in part on the historical expenses. In some embodiments, determining a recommended allocation for a DCA may include taking into account one or more changes in regulations regarding DCAs (e.g., the maximum amount of money that may be allocated to a DCA), and/or one or more anticipated changes in the status of a dependent of the consumer (e.g., the addition of a family member following a birth, or the disqualification of some historical expenses in a future time period due to a dependent's age.) Identification of recurring dependent care expenses, confirmation of their likelihood of continuing, and input of anticipated changes may all be performed using methods similar to those described herein for identifying recurring healthcare-related expenses, confirming their likelihood of continuing, and inputting anticipated changes in a dependent's healthcare status.

In some embodiments, a DCA allocation application may be implemented as a component of an FSA allocation application or a comprehensive healthcare management or financial management application, as described herein. In other embodiments, a DCA allocation application may be implemented as a separate application configured to exchange information with an FSA allocation application, a comprehensive healthcare management application, or a financial management application, or it may be implemented as a stand-alone application. A comprehensive healthcare management application or financial management application may in some embodiments be configured to recommend a particular balance between money allocated to a DCA and money allocated to an FSA dependent on a total amount of money available for allocation to both accounts, a maximum amount allowed to be deposited in each account, the tax benefits that may be realized by utilizing each type of account, or other factors. For example, a comprehensive healthcare management application or financial management application may be configured to recommend that a maximum allowable amount (based on projected dependent care expenses) be allocated to a DCA, while recommending that an amount less than a maximum allowable amount (and/or less than a projected total for healthcare-related expenses) be allocated to an FSA, since recurring dependent care expenses may in many cases be more accurately predicted than recurring healthcare-related expenses. Such a recommendation may maximize the benefit of the two accounts to the consumer while reducing the risk that some or all of the allocation(s) may not be used, and may thus be forfeited.

Exemplary Systems

Figure 5:
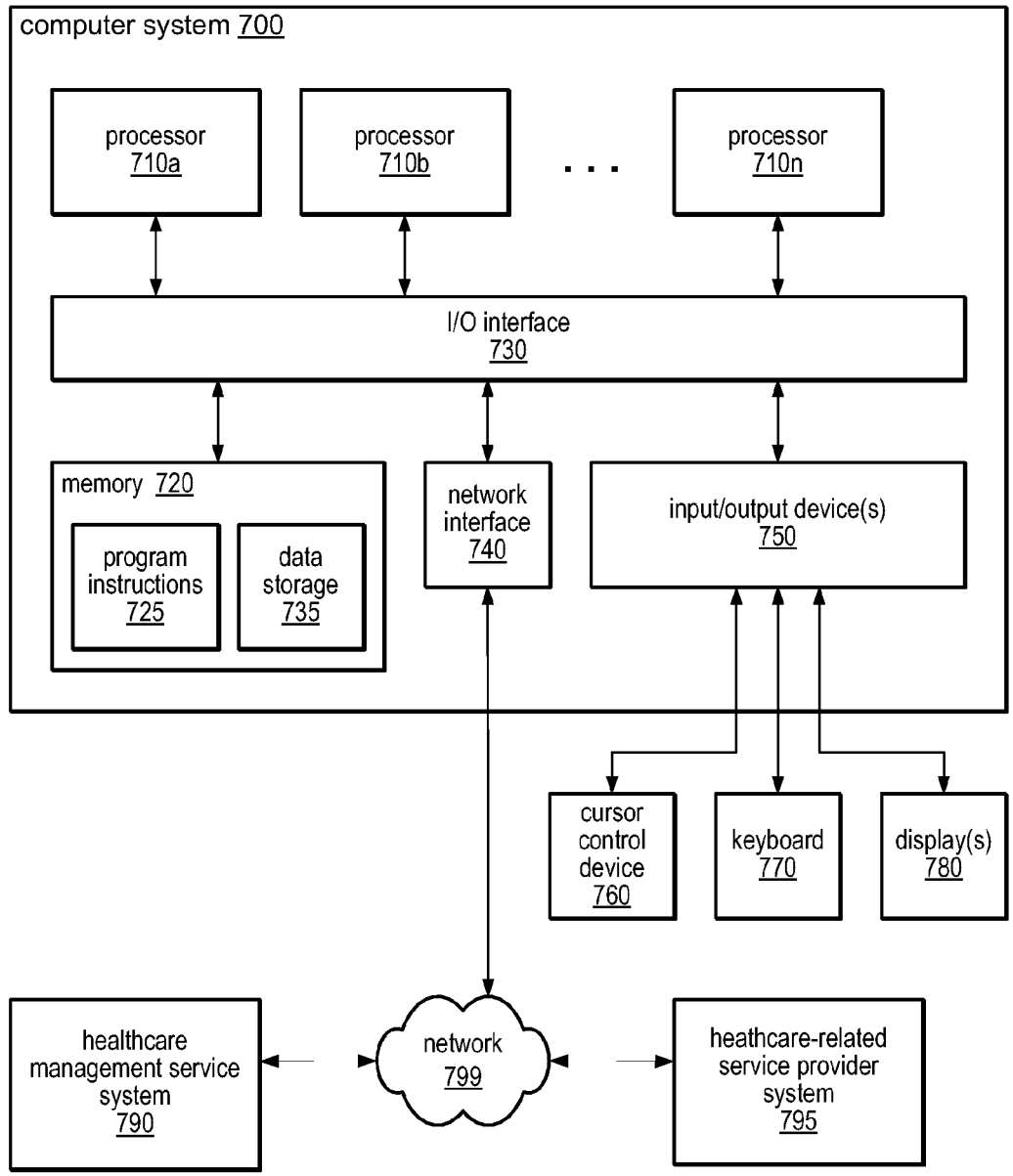
FIG. 5 illustrates an exemplary computing system on which various embodiments may be implemented.

An exemplary computer system 700 suitable for implementing the FSA allocation application described herein is illustrated in FIG. 5. Computer system 700 may represent an FSA allocation recommendation service server, a comprehensive healthcare management service server, a client computing system, or a local computing system used to access and/or execute an FSA allocation recommendation application. For example, in some embodiments, one or more of healthcare management service system 790 and/or healthcare-related service provider system 795 may include the same or similar components and functionality as computer system 700. In other embodiments, healthcare management service system 790 and/or healthcare-related service provider system 795 may include different components and/or functionality than computer system 700, or a subset of the components and functionality described herein regarding computer system 700.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment a client portion of an FSA allocation application may be implemented via one or more nodes of computer system 700 that are distinct from a node implementing a server portion of the FSA allocation application.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above regarding an FSA allocation application and associated historical claim data and insurance plan data, are shown stored within system memory 720 as program instructions 725 and data storage 735, respectively. For example, program instructions 725 may include instructions configured to implement recurring expense analyzer 345, initial allocation estimator 355, and/or FSA allocation recommender 350, as described herein. Similarly, data storage 735 may be configured to maintain health insurance claim data 310, FSA claim data 320, and/or health insurance plan data 330, in various embodiments. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In some embodiments, program instructions and data implementing a comprehensive healthcare management application, as described herein, may be stored within system memory 720 as part of program instructions 725 and data storage 735, respectively, and/or the FSA allocation application may be a module of a comprehensive healthcare management application stored within system memory 720. In other embodiments, program instructions and data implementing a comprehensive healthcare management application may be stored in memory on a separate computing system, such as healthcare management service system 790. In other embodiments, historical claim data may be stored in a memory on one or more of healthcare-related service provider systems 795 accessible to the FSA allocation application, rather than on computing system 700 or healthcare management service system 790.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other computing systems attached to a network 799, such as healthcare management service system 790, and/or one or more healthcare-related service provider systems 795. In other embodiments, network interface 740 may be configured to allow data to be exchanged between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 5, memory 720 may include program instructions 725, configured to implement embodiments of an FSA allocation application as described herein, and data storage 735, comprising various databases and/or other data structures accessible by program instructions 725. For example, in one embodiment, program instructions 725 may implement a server portion of an FSA allocation application, which may include a recurring expense analyzer 345, initial allocation estimator 355, and/or FSA allocation recommender 350, as described herein. In other embodiments, program instructions 725 may implement a client portion of an FSA allocation application and/or other applications suitable for carrying out the functionality needed to access an FSA allocation service. For example, program instructions 725 may include instructions configured to implement a web browser application or any other application suitable for facilitating communication between an FSA allocation service and a consumer's computing system. In one embodiment, data storage 735 may be configured to implement a database, such as one configured to store and/or manage healthcare management application data 300, as described herein. In other embodiments, additional or different software elements and data may be included in memory 720.

Those skilled in the art will appreciate that computer system 700 is merely illustrative and is not intended to limit the scope of the present invention. In particular, the computer system and devices may include any combination of hardware or software that can perform the indicated functions, including computers, network devices, internet appliances, PDAs, wireless phones, pagers, etc. Computer system 700 may also be connected to other devices that are not illustrated. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Note that the user interface mechanisms and elements as illustrated and described are exemplary and are not intended to be limiting, and various modifications to or variations of the mechanisms and elements are possible, as are alternative user interface mechanisms and elements that are configured to perform similar functions.

The methods described herein may be implemented in software, hardware, or a combination thereof, in different embodiments. In addition, the order of method may be changed, and various elements may be added, reordered, combined, omitted, modified, etc. Various modifications and changes may be made as would be obvious to a person skilled in the art having the benefit of this disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A computer-implemented method, comprising:
    receiving, at a consumer computing system, historical healthcare-related claim information comprising one or more prior healthcare-related expenses relating to previously filed healthcare claims and historical healthcare expense information relating to prior healthcare-related expenses that have not been claimed for either insurance or flexible spending account reimbursement;
    predicting, using the consumer computing system, that at least one of the one or more prior healthcare-related expenses is likely to be incurred in a given future time period, the predicting comprising consideration of how long a given recurring expense or associated condition has existed, whether a single-treatment expense in the historical healthcare related claim information relates to a treatment that typically involves a series of treatments, and whether multiple claims within the historical healthcare-related claim information are associated with duplicate information, the duplicate information including diagnosis code, treatment or procedure code, or prescription name;
    estimating an initial flexible spending account allocation dependent on said determining and also on identifying whether the number of claims and expenses associated with one or more particular conditions have increased over a given time period and thus are likely to increase further; and producing a recommended flexible spending account allocation for a healthcare consumer corresponding to the given future time period dependent on said initial flexible spending account allocation and on projected benefits of one or more health insurance plans for the given future time period.

2. The method of claim 1, wherein the historical healthcare-related claim information comprises healthcare-related claim information for the healthcare consumer for a current health insurance plan year.

3. The method of claim 1, wherein the historical healthcare-related claim information comprises healthcare-related claim information for the healthcare consumer for two or more previous health insurance plan years.

4. The method of claim 1, wherein the historical healthcare-related claim information comprises health insurance claim information and flexible spending account reimbursement claim information.

5. The method of claim 1, wherein the historical healthcare-related claim information comprises healthcare-related claim information received from a healthcare management application.

6. The method of claim 1, wherein said determining comprises determining a duration of a medical condition or course of treatment.

7. The method of claim 1, wherein said determining comprises receiving confirmation from the healthcare consumer that the at least one of the one or more prior expenses is expected to be incurred in the given future time period.

8. The method of claim 1, wherein said estimating comprises calculating an amount at least as large as a sum of the at least one of the one or more prior expenses predicted to be incurred in the given future time period.

9. The method of claim 1, wherein said producing comprises adjusting said initial flexible spending account allocation dependent on any differences between said projected benefits and benefits of a prior year health insurance plan.

10. The method of claim 1, wherein said producing comprises adjusting said initial flexible spending account allocation dependent on other historical healthcare-related expense information received on behalf of the healthcare consumer.

11. The method of claim 1, wherein said producing comprises adjusting said initial flexible spending account allocation dependent on projected healthcare-related expense information received on behalf of the healthcare consumer.

12. The method of claim 1, further comprising receiving information indicating a change in one or more dependents of the healthcare consumer, wherein said producing comprises adjusting said initial flexible spending account allocation dependent on said received information.

13. The method of claim 1, further comprising receiving information indicating a change in health for the healthcare consumer or one or more dependents of the healthcare consumer, wherein said producing comprises adjusting said initial flexible spending account allocation dependent on said received information.

14. The method of claim 1, further comprising detecting in said historical healthcare-related claim information one or more of: an average of two or more similar expenses, a trend in expenses associated with a given condition, a rate of change in a group of related expenses, and a rate of change in a recurring expense, wherein said producing comprises adjusting said initial flexible spending account allocation dependent on results of said detecting.

15. The method of claim 1, wherein said accessing, said determining, said estimating, and said producing are performed by a software application configured to produce a recommended flexible spending account allocation for an upcoming FSA plan period.

16. A computing system, comprising:
one or more processors;
memory coupled to the one or more processors, wherein the memory is configured to store:
historical healthcare-related claim information comprising one or more prior healthcare-related expenses relating to previously filed healthcare claims and historical healthcare expense information relating to prior healthcare-related expenses that have not been claimed for either insurance or flexible spending account reimbursement; and
program instructions executable by the one or more processors to implement a flexible spending account allocation application configured to:
access the historical healthcare-related claim information and the historical healthcare expense information;
predict that at least one of the one or more prior healthcare-related expenses is likely to be incurred in a given future time period, the predicting comprising consideration of how long a given recurring expense or associated condition has existed, whether a single-treatment expense in the historical healthcare related claim information relates to a treatment that typically involves a series of treatments, and whether multiple claims within the historical healthcare-related claim information are associated with duplicate information, the duplicate information including diagnosis code, treatment or procedure code, or prescription name;
estimate an initial flexible spending account allocation dependent on said determining and also on identifying whether the number of claims and expenses associated with one or more particular conditions have increased over a given time period and thus are likely to increase further; and
produce a recommended flexible spending account allocation for a healthcare consumer corresponding to the given future time period dependent on said initial flexible spending account allocation and on projected benefits of one or more health insurance plans.

17. The system of claim 16, wherein the historical healthcare-related claim information comprises healthcare-related claim information for the healthcare consumer for one or more health insurance plan years.

18. The system of claim 16, wherein the historical healthcare-related claim information comprises one or more of: health insurance claim information and flexible spending account reimbursement claim information.

19. The system of claim 16, wherein the historical healthcare-related claim information comprises healthcare-related claim information received from a healthcare management application.

20. The system of claim 16, wherein said determining comprises determining a duration of a medical condition or course of treatment.

21. The system of claim 16, wherein to determine if any of the one or more prior expenses are predicted to be incurred in the given future time period, said flexible spending account allocation application is further configured to prompt the healthcare consumer to provide an indication of whether or not any of the one or more prior expenses are expected to be incurred in the given future time period.

22. The system of claim 16, wherein said estimating comprises calculating an amount at least as large as a sum of the at least one of the one or more prior expenses predicted to be incurred in the given future time period.

23. The system of claim 16, wherein said producing comprises adjusting said initial flexible spending account allocation dependent on one or more of: any differences between said projected benefits and any prior year health insurance plan benefits, other historical healthcare-related expense information received on behalf of the healthcare consumer, and projected healthcare-related expense information received on behalf of the healthcare consumer.

24. The system of claim 16, wherein said flexible spending account allocation application is further configured to receive information indicating a change in one or more dependents of the healthcare consumer or a change in health for the healthcare consumer or one or more dependents of the healthcare consumer, wherein said producing comprises adjusting said initial flexible spending account allocation dependent on said received information.

25. The system of claim 16, wherein said flexible spending account allocation application is further configured to detect in said historical healthcare-related claim information one or more of: an average of two or more similar expenses, a trend in expenses associated with a given condition, a rate of change in a group of related expenses, and a rate of change in a recurring expense, wherein said producing comprises adjusting said initial flexible spending account allocation dependent on results of said detecting.

26. The system of claim 16, wherein said flexible spending account allocation application is further configured to prompt the healthcare consumer to provide information indicating any expected changes in health insurance plan benefits, any expected changes in one or more dependents of the healthcare consumer, or any expected changes in health for the healthcare consumer or one or more dependents of the healthcare consumer, wherein said producing comprises adjusting said initial flexible spending account allocation dependent on the information provided in response to said prompt.

27. A nontransitory computer-readable storage medium, comprising program instructions computer-executable to implement a reimbursement account allocation application configured to:
   receive historical healthcare-related claim information comprising one or more prior healthcare-related expenses relating to previously filed healthcare claims and historical healthcare expense information relating to prior healthcare-related expenses that have not been claimed for either insurance or flexible spending account reimbursement;
   predict that at least one of the one or more prior healthcare-related expenses is likely to be incurred in a given future time period, the predicting comprising consideration of how long a given recurring expense or associated condition has existed, whether a single-treatment expense in the historical healthcare related claim information relates to a treatment that typically involves a series of treatments, and whether multiple claims within the historical healthcare-related claim information are associated with duplicate information, the duplicate information including diagnosis code, treatment or procedure code, or prescription name;
   estimate an initial reimbursement account allocation dependent on said determining and also on identifying whether the number of claims and expenses associated with one or more particular conditions have increased over a given time period and thus are likely to increase further; and
   produce a recommended reimbursement account allocation for a consumer corresponding to the given future time period dependent on said initial reimbursement account allocation and on projected benefits related to the reimbursement account.

28. The storage medium of claim 27, wherein the reimbursement account is a dependent care account (DCA).

29. The storage medium of claim 28, wherein said producing comprises adjusting the initial reimbursement account allocation dependent on one or more of: a change in applicable regulations, a change in an employer-specified maximum allowable DCA allocation, a change in status for one or more dependents of the consumer, and an anticipated change in dependent care expenses for the given future time period.

30. The storage medium of claim 27, wherein the reimbursement account is a flexible spending account (FSA).

31. The storage medium of claim 30, wherein the historical claim information comprises healthcare-related claim information for the consumer for one or more health insurance plan years.

32. The storage medium of claim 30, wherein the historical claim information comprises one or more of: health insurance claim information and flexible spending account reimbursement claim information.

33. The storage medium of claim 30, wherein the historical claim information comprises healthcare-related claim information received from a healthcare management application.

34. The storage medium of claim 30, wherein said determining comprises determining a duration of a medical condition or course of treatment.

35. The storage medium of claim 30, wherein to determine if the at least one of the one or more prior expenses are predicted to be incurred in the given future time period, said reimbursement account allocation application is further configured to prompt the consumer to provide an indication of whether or not any of the one or more prior expenses are expected to be incurred in the given future time period.

36. The storage medium of claim 30, wherein said estimating comprises calculating an amount at least as large as a sum of said the at least one of the one or more prior expenses predicted to be incurred in the given future time period.

37. The storage medium of claim 30, wherein said producing comprises adjusting said initial reimbursement account allocation dependent on one or more of: any differences between projected benefits of one or more health insurance plans and any prior year health insurance plan benefits, other historical healthcare-related expense information received on behalf of the consumer, and projected healthcare-related expense information received on behalf of the consumer.

38. The storage medium of claim 30, wherein said reimbursement account allocation application is further configured to receive information indicating a change in one or more dependents of the consumer or a change in health for the consumer or one or more dependents of the consumer, wherein said producing comprises adjusting said initial reimbursement account allocation dependent on said received information.

39. The storage medium of claim 27, wherein said reimbursement account allocation application is further configured to detect in said historical claim information one or more of: an average of two or more similar expenses, a trend in two or more related expenses, a rate of change in a group of related expenses, and a rate of change in a recurring expense, wherein said producing comprises adjusting said initial reimbursement account allocation dependent on results of said detecting.

40. The storage medium of claim 27, wherein said reimbursement account allocation application is further configured to prompt the consumer to provide information indicating any expected changes in benefits related to the reimbursement account, any expected changes in one or more dependents of the consumer, or any expected changes in expenses reimbursable from the reimbursement account, wherein said producing comprises adjusting said initial reimbursement account allocation dependent on the information provided in response to said prompt.

\* \* \* \* \*